G. E. SPEAR.
THERMOMETER.
APPLICATION FILED MAY 19, 1913.
1,161,262.
Patented Nov. 23, 1915.
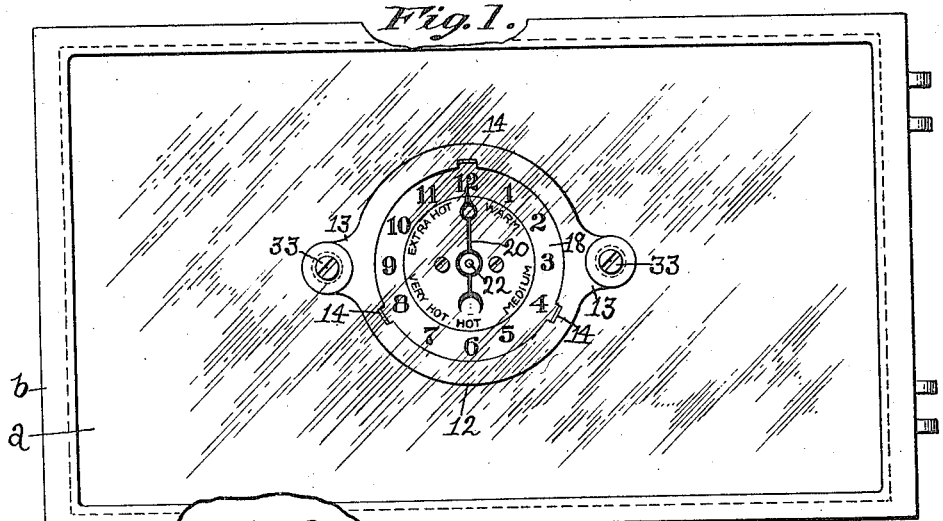
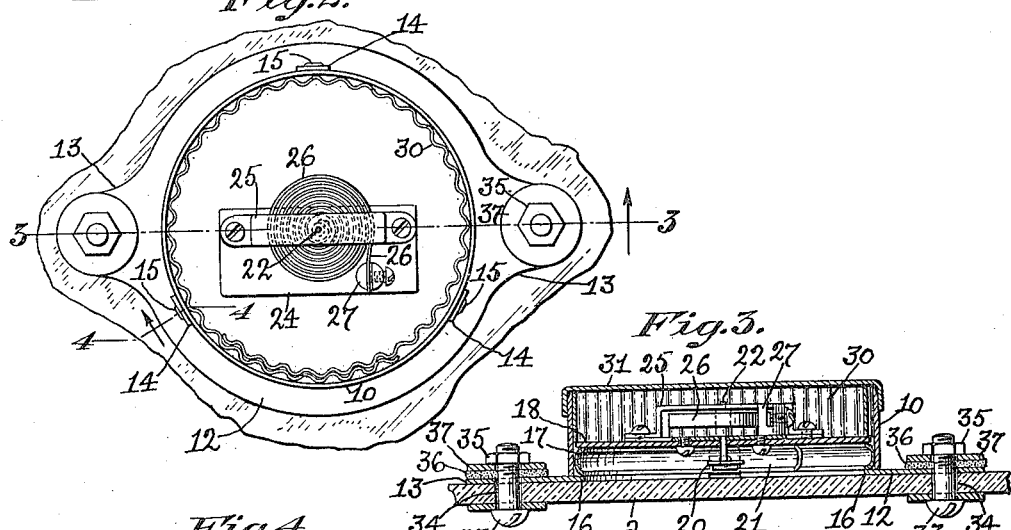
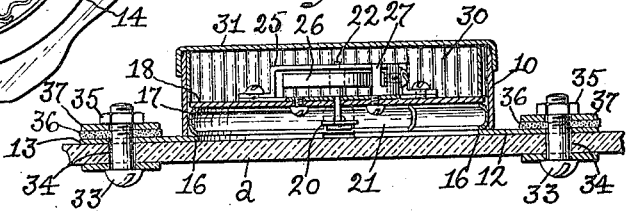
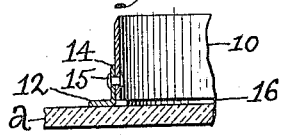
Witnesses:
Inventor,
George E. Spear
by Jas. H. Churchill
Atty.

UNITED STATES PATENT OFFICE.

GEORGE E. SPEAR, OF AMESBURY, MASSACHUSETTS, ASSIGNOR TO STANDARD THERMOMETER COMPANY, OF BOSTON, MASSACHUSETTS, A CORPORATION OF MAINE.

THERMOMETER.

1,161,262.  Specification of Letters Patent.  Patented Nov. 23, 1915.

Application filed May 19, 1913. Serial No. 768,454.

*To all whom it may concern:*

Be it known that I, GEORGE E. SPEAR, a citizen of the United States, residing in Amesbury, county of Essex, and State of Massachusetts, have invented an Improvement in Thermometers, of which the following description, in connection with the accompanying drawings, is a specification, like letters on the drawings representing like parts.

This invention has for its object to provide a thermometer, which is capable of being secured in fixed relation to the rear surface of a plate of glass, whereby the indicating parts of the instrument are protected from harm, yet are visible through the glass.

The invention is especially applicable to the glass doors of kitchen ranges for indicating the temperature of the ovens of said ranges, and provision is made for attaching the thermometer to the glass door without loss of heat from the oven.

The invention further has for its object to provide a simple and inexpensive thermometer for the purpose specified.

These and other features of this invention will be pointed out in the claim at the end of this specification.

Figure 1 represents a glass oven door provided with a thermometer in accordance with this invention. Fig. 2, a rear elevation of the instrument shown in Fig. 1, with the cap of the metal casing removed. Fig. 3, a section on the line 3—3, Fig. 2, and Fig. 4, a section on the line 4—4, Fig. 2.

Referring to the drawing. *a* represents a plate of glass, which is secured in any suitable manner to the metal frame *b* of a door for a kitchen range of any suitable or usual construction.

The plate of glass *a* will be referred to as the glass door, and has secured to its rear surface a thermometer, preferably of the construction herein shown.

The instrument herein shown is provided with a metal casing or cylinder 10 open at its opposite ends, and having attached to its front end a flat metal ring 12, provided with outwardly extended ears 13 and with lugs 14 extended from the ring substantially at right angles thereto, and to which the cylinder or casing *a* is firmly secured as by rivets 15 or otherwise (see Fig. 4).

The lugs 14 are struck up from the flat ring 12 and the casing *a* is made of larger diameter than the internal diameter of the said ring, so that the latter forms an inwardly extended annular flange 16 (see Fig. 3) for the casing 10, against which bears a spacing ring 17, which is preferably concaved transversely. The spacing ring 17 forms a support for a dial 18, provided with suitable characters to indicate different degrees of temperature.

In the present instance, the dial is provided with the words Warm, Medium, Hot, Very hot, Extra hot. The dial 18 has coöperating with it a pointer 20, which is located in the space or chamber 21, formed by the dial 18 and the glass door *a* to which the casing 10 is secured, as will be described.

The pointer 20 is fast on a shaft 22, which is extended through the dial 18 and is supported by a frame comprising a metal plate 24 and a cross bar 25, secured to said plate and having a portion separated therefrom a suitable distance to receive a thermostatic strip 26, which is fastened at one end to a post 27 on the plate 24, and has its other end connected with the shaft 22 to rotate the latter, said strip being provided with a plurality of convolutions occupying the same plane, so as to reduce the size and cheapen the cost of the instrument.

The dial 18 is held in place against the spacing ring 17 by a retaining ring 30, preferably formed from a corrugated metal strip, which is held in its place by a cap or cover 31, which fits over the rear open end of the cylinder or casing 10.

The casing 10 may be attached to the glass door *a* by screws or bolts 33, which are passed through holes 34 in the glass door and through the ears 13, and are engaged by nuts 35.

Passage of heat from the oven out through the holes 34 in the glass door may be prevented by asbestos or like washers 36, through which the bolts 33 are passed, and which are pressed tightly around the said bolts and against the ears 13 by metal washers 37, which are engaged by the nuts 35.

From the above description, it will be seen that the glass plate or door *a* forms a transparent front wall for the casing 10 of the thermometer, and that the dial and pointer are visible therethrough, so that the temperature in the oven is made known to the cook by the position of the pointer with respect to the dial.

While the invention is especially applicable to kitchen ranges, it is not desired to limit it to this use, as the glass plate *a* may form part of the door or other part of a refrigerator, or it may be a window in a room or chamber, whose temperature it is desired to note without opening the door. Furthermore, it will be noticed that the pointer is protected by the glass and is not exposed and therefore liable to be broken or damaged, or the instrument rendered inaccurate by the pointer being struck accidentally or otherwise.

Claim—

The combination with a glass plate, of a thermometer casing open at its front end and provided with ears extended laterally from said front end, a dial, a thermostatic strip and a movable device coöperating therewith located in said casing behind the front surface of said casing, said device being actuated by said thermostat, means within said casing for supporting said strip and movable device, fastening means extended through said glass plate and coöperating with said ears to secure the said casing to the glass plate to have its open end closed thereby, and means for effecting a tight joint about said fastening means.

In testimony whereof, I have signed my name to this specification in the presence of two subscribing witnesses.

GEORGE E. SPEAR.

Witnesses:
 FRED D. HAGAR,
 EVA M. REED.

Copies of this patent may be obtained for five cents each, by addressing the "Commissioner of Patents, Washington, D. C."